(12) United States Patent
Aoki

(10) Patent No.: US 12,023,684 B2
(45) Date of Patent: Jul. 2, 2024

(54) SORTING MACHINE AND METHOD FOR TREATING ELECTRONIC/ELECTRIC DEVICE COMPONENT SCRAPS

(71) Applicant: JX METALS CORPORATION, Tokyo (JP)

(72) Inventor: Katsushi Aoki, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 0 days.

(21) Appl. No.: 17/598,944

(22) PCT Filed: Mar. 27, 2020

(86) PCT No.: PCT/JP2020/014368
§ 371 (c)(1),
(2) Date: Sep. 28, 2021

(87) PCT Pub. No.: WO2020/203919
PCT Pub. Date: Oct. 8, 2020

(65) Prior Publication Data
US 2022/0184635 A1    Jun. 16, 2022

(30) Foreign Application Priority Data
Mar. 29, 2019    (JP) .................................. 2019-069371

(51) Int. Cl.
*B03C 1/23*   (2006.01)
*B03C 1/18*   (2006.01)

(52) U.S. Cl.
CPC . *B03C 1/23* (2013.01); *B03C 1/18* (2013.01)

(58) Field of Classification Search
CPC ........... B03C 1/23; B03C 1/18; B07B 13/003; B07B 13/04
See application file for complete search history.

(56) References Cited

U.S. PATENT DOCUMENTS

| | | | | | |
|---|---|---|---|---|---|
| 1,190,950 | A | * | 7/1916 | Piepgras et al. ...... | B07B 13/003 209/931 |
| 2,964,181 | A | * | 12/1960 | Demarest ............. | A22C 29/005 209/906 |

(Continued)

FOREIGN PATENT DOCUMENTS

| JP | 50-003548 U    | 1/1975 |
|---|---|---|
| JP | 50-003548 U1 * | 1/1975 |

(Continued)

OTHER PUBLICATIONS

EPA, Wastes-Non-Hazardous Waste-Municipal Solid Waste [retrieved on Jun. 8, 2023]. Retrieved from the internet<URL: http://https://archive.epa.gov/epawaste/nonhaz/municipal/web/html> 2 (Year: 2023).*

(Continued)

*Primary Examiner* — Patrick H Mackey
(74) *Attorney, Agent, or Firm* — Birch, Stewart, Kolasch & Birch, LLP

(57) ABSTRACT

Provided is a sorting machine capable of more easily and efficiently sorting specific parts having a specific shape from raw materials containing various substances having different shapes, and a method for treating electronic and electric device component scraps using the sorting machine. The sorting machine includes a conveying device 1 having a conveying surface 13 which conveys raw materials containing substances having different shapes from a raw material inlet 11 to a receiving port 12; and a gate device 2 provided with a cylindrical roll portion 21 having a rotating function arranged at a certain distance d on the conveying surface to allow at least a part of the raw materials 100 to pass through to the receiving port 12.

9 Claims, 4 Drawing Sheets

(56) References Cited

U.S. PATENT DOCUMENTS 4,031,004 A * 6/1977 Sommer, Jr. .............. B03C 1/23
209/636
4,609,110 A * 9/1986 Schulman ............... B07B 13/05
209/663

FOREIGN PATENT DOCUMENTS

| JP | 50-003548 U1 * | 1/1975 |
| JP | 54-008358 A | 1/1979 |
| JP | 59-142080 U | 9/1984 |
| JP | 7-007471 U | 2/1995 |
| JP | 9-075903 A | 3/1997 |
| JP | 9-078151 A | 3/1997 |
| JP | 2000-108126 A | 4/2000 |
| JP | 2014-141045 A | 8/2014 |
| JP | 2014141045 A * | 8/2014 |
| JP | 2015-123418 A | 7/2015 |
| JP | 2018-161615 A | 10/2018 |
| KR | 10-2017-0064183 A | 6/2017 |

OTHER PUBLICATIONS

English translation of the International Preliminary Report on Patentability and Written Opinion of the International Searching Authority (Forms PCT/IB/338, PCT/IB/373 and PCT/ISA/237) for corresponding International Application No. PCT/JP2020/014368, dated Oct. 14, 2021.
International Search Report (PCT/ISA/210) issued in PCT/JP2020/014368, mailed on Jun. 9, 2020.

* cited by examiner

SORTING MACHINE AND METHOD FOR TREATING ELECTRONIC/ELECTRIC DEVICE COMPONENT SCRAPS

FIELD OF THE INVENTION

The present invention relates to a sorting machine and a method for treating electronic and electric device component scraps. More particularly, it relates to a sorting machine and a method for treating electronic and electric device component scraps suitable for recycling of used electronic and electric devices.

BACKGROUND OF THE INVENTION

From the viewpoint of recent resource conservation, recovery of variable metals from electronic and electric device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with a copper smelting step in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electric device component scrap processed may lead to an increase in a carbon component contained in organic substances such as resins forming the electronic and electric device component scrap, which may cause troubles due to over-reduction in the smelting furnace. On the other hand, since the amount of the electronic and electric device component scrap processed tends to be increased in recent years, there is a need for efficient processing in the copper smelting flash furnace.

As one of methods for preventing the generation of troubles due to over-reduction in the copper smelting flash furnace, it is proposed that the electronic and electric device component scrap is crushed before processing of the electronic and electric device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

CITATION LIST

Patent Literatures

[Patent Literature 1] Japanese Patent Application Publication No. H09-78151 A
[Patent Literature 2] Japanese Patent Application Publication No. 2015-123418 A

SUMMARY OF THE INVENTION

However, the increased amount of electronic and electric device component scraps processed leads to introduction of a larger amount of unwanted substances (smelting inhibitors) for processing in the subsequent copper smelting step than in the prior arts, depending on types of substances contained in the electronic and electric device component scraps. An increased amount of the smelting inhibitors introduced into such a copper smelting step arises a situation where an amount of the electronic and electric device component scraps to be introduced has to be limited.

Although numerous efforts have been made to develop thermodynamic methods in the smelting process of copper smelting and electrolyte refining methods in the electrolysis process, including a matter of smelting inhibitors derived from natural ores, there are still many issues to be solved in the treatment of electronic and electric equipment component scraps, which contains a significantly higher percentage of smelting inhibitors compared to natural ores.

For example, in order to efficiently produce raw materials for introducing into the smelting process while reducing smelting inhibitors from the electronic and electric equipment component scraps, mechanical processing using various sorting machines may be desirable from a viewpoint of efficiency.

The present inventors have been studying various sorting processes and sorting machines that are suitable for efficiently sorting raw materials containing valuable metals for processing in the smelting process from the electronic and electric component scraps and for removing the smelting inhibitors.

However, it is sometimes difficult to sort out specific parts for recycling because the electronic and electric device component scraps is a mixture of various parts with various shapes. Although it is possible to sort specific parts with high accuracy by using a manual sorting or the like, it is not preferable when processing a large volume of raw materials quickly.

The present disclosure provides a sorting machine capable of more easily and efficiently sorting specific parts having a specific shape from raw materials containing various substances having different shapes, and a method for treating electronic and electric device component scraps using the sorting machine.

In an aspect of an embodiment of the present invention, a sorting machine which includes a conveying device having a conveying surface which conveys raw materials containing substances having different shapes from a raw material inlet to a receiving port; and a gate device provided with a cylindrical roll portion having a rotating function, arranged with a certain space on the conveying surface to allow at least a part of the raw materials to pass through to the receiving port.

According to the present disclosure, it is possible to provide a sorting machine capable of more easily and efficiently sorting specific parts having a specific shape from raw materials containing various substances having different shapes, and a method for treating electronic and electric device component scraps using the sorting machine.

DETAILED DESCRIPTION OF THE INVENTION

Figure 1:
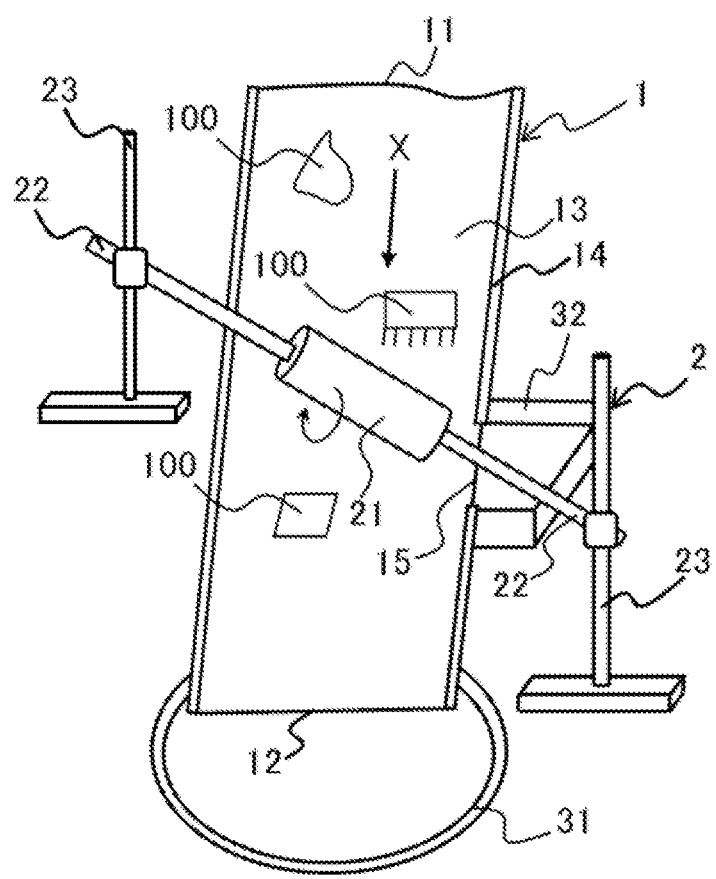
FIG. 1 is a schematic diagram showing a sorting machine according to an embodiment of the present invention.

Hereinafter, embodiments of the present invention will be described with reference to the drawings. In descriptions of the drawings below, the same or similar portions are designated by the same or similar reference numerals. It should be noted that embodiments shown below illustrate devices and methods for embodying the technical idea of the present invention, and the technical idea of the present invention is not intended to limit structures, arrangements, etc. of components to those described below.

(Raw Material Supply Apparatus)

As shown in FIG. 1, a sorting machine includes a conveying device 1 having a conveying surface 13 which conveys raw materials 100 containing a plurality of substances having different shapes from a raw material inlet 11 to a receiving port 12, and a gate device 2 provided with a cylindrical roll portion 21 arranged with a certain distance d on the conveying surface 13 to allow at least a part of the raw materials 100 to pass through to the receiving port 12.

The conveying device 1 is not particularly limited if it is a device capable of conveying the raw materials 100 in a conveying direction X. A device such as conveyor, slope, or the like that continuously conveys the raw materials 100 through a certain route can be used as the conveying device 1. Although the conveying surface 13 may be horizontal to a horizontal plane, it may be more advantageous that the conveying surface 13 is inclined with respect to the horizontal plane so that power for conveying can be omitted.

Figure 2:
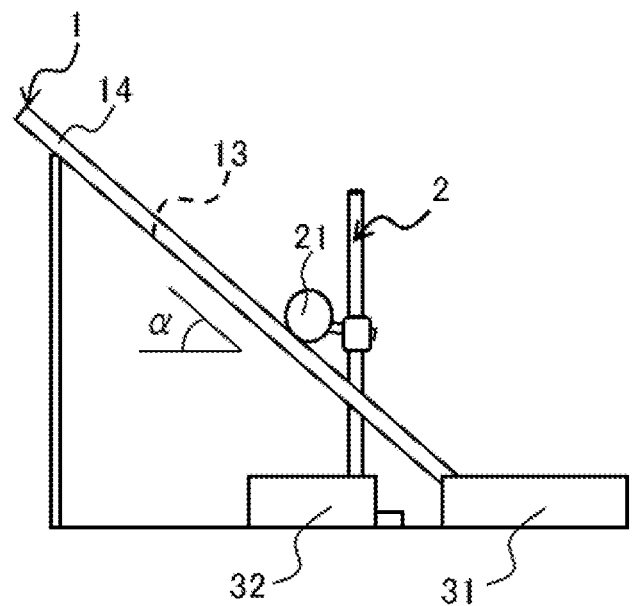
FIG. 2 is a side view of the sorting machine according to the embodiment of the present invention.

As shown in FIG. 2, the conveying surface 13 is preferably inclined so as to have a predetermined inclination angle α with respect to the horizontal plane. This allows the raw material 100 conveyed to the raw material inlet 11 to be conveyed with a certain conveying speed due to its own weight without requiring power for conveyance.

However, if the inclination angle α of the conveying surface 13 is too large, when the raw material 100 comes into contact with the roll portion 21, the raw materials 100 may be repelled by the roll portion 21 and may be jumped out from the conveying surface 13. As a result, it may not be possible to sort the raw materials 100 well. On the other hand, if the inclination angle α is too small, the raw materials 100 may not be conveyed properly and may stay on the conveying surface 13.

Although it is also related to the rotation speed of the roll portion 21, which will be described later, the inclination angle α of the conveying surface 13 relative to the horizontal plane is preferably at 30° to 75°, and more preferably at 40° to 60° when processing the electronic and electric device component scraps that contain aluminum-containing materials such as substrates and capacitors, thin metal plates, thick-walled substrates, and the like.

As shown in FIG. 1, guides 14 are provided at both ends of the conveying surface 13 to convey the raw material 100 toward the conveying direction X while preventing the material 100 from falling from the conveying surface 13. One of the guides 14 is provided with a notch 15 that is continuous with the conveying surface 13. The roll portion 21 of the gate device 3 is inserted on the conveying surface 13 through the notch 15.

Some of the raw materials 100 are captured by the roll portion 21, and are conveyed to the notch 15 while sliding on an outer circumference of the roll portion 21 in the conveying direction X, and are discharged out of the conveying device 1 through the notch 15. A captured material accommodating unit 32 is arranged immediately below the notch 15 for accommodating the raw materials 100 discharged out of the conveying device 1 through the notch 15. A sorting material accommodating unit 31 for accommodating the sorted material is arranged immediately below the receiving port 12.

The gate device 2 may include a cylindrical roll portion 21 having a rotating function, a support portion 22 which supports the roll portion 21, and a fixing portion 23 which fixes the support portion 22. The roll portion 21 is configured to be rotatable by a drive mechanism (not shown). By rotating the roll portion 21 in a predetermined direction, the raw materials 100 can be prevented from being caught on the roll portion 21, thereby improving the sorting efficiency of the sorted material.

It is preferable that the roll portion 21 rotates in a clockwise direction so as to return the raw materials 100 to the opposite direction of the conveying direction X. This can suppress malfunctions and defects of the roll portion 21 due to, for example, component scraps having sharp corners being caught or stuck in the roll portion 21 when processing the electronic and electric equipment component scraps having various shapes and specific gravities included in the raw material 100.

In addition, the clockwise rotation of the roll portion 21 provides a repulsive force to the component scraps whose thickness varies along the conveying direction X, for example, those whose thickness is thicker on the raw material input port 11 side and gradually thinner toward the receiving port 12 side, thereby reducing the occurrence of defects and failures when they are caught in the gap between the roll portion 21 and the conveying surface 13.

The preferred rotation speed of the roll portion 21 is not limited to the following, but for example, when the electronic and electric equipment component scraps are processed as the raw materials 100 and the inclination angle α of the conveying surface 13 is set to 30° to 75°, the rotation speed can be set to 100 to 500 rpm, and more preferably 200 to 300 rpm. In this case, the falling speed of the raw materials 100 may be such that the raw materials that cannot pass through is repelled by roll rotation and exit from the notch 15. In the present invention, it may be set that the raw materials roll down the conveying surface 13 having a length of 1.2 m in 1 to 5 seconds. Although it is not limited to the following, for example, a motor having an output of 0.1 to 1.0 kW and a torque of 5 to 20 N2N·m can be used to rotate the roll portion 21 at 100 to 500 rpm.

Figure 3:
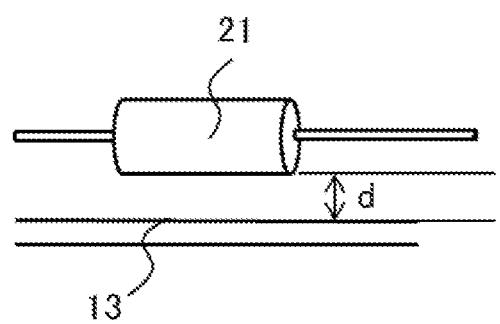
FIG. 3 is a schematic diagram for explaining a distance between a roll portion and a conveying surface.

As shown in FIG. 3, the roll portion 21 is spaced to have a certain distance d mm from the conveying surface 13. This distance d can be appropriately adjusted depending on the thickness of the substance to be sorted. For example, it is preferable to adjust this constant distance d between 5 and 15 mm when the electronic and electric equipment component scraps which is coarsely crashed with a diameter of about 100 mm or less are sorted as the raw materials 100. The constant distance d may be appropriately selected according to the types of the electronic and electric equipment component scraps. This allows for more efficient separation of the desired sorted materials. For example, the roll portion 21 with a diameter of 20 to 100 mm and a length of 200 mm or more may be used as the size of the roll portion 21 for processing the electronic and electric equipment component scraps coarsely crushed to a diameter of 100 mm or less.

For example, various raw materials such as metal, plastic, and rubber can be used as the material of the roll portion 21. Among them, it is preferable to be formed of an elastic material such as rubber. For example, it is preferable to use a raw material with a rubber hardness (JIS K6253) of 50 to 90, preferably 60 to 80, as the material of the roll portion 21.

Figure 4:
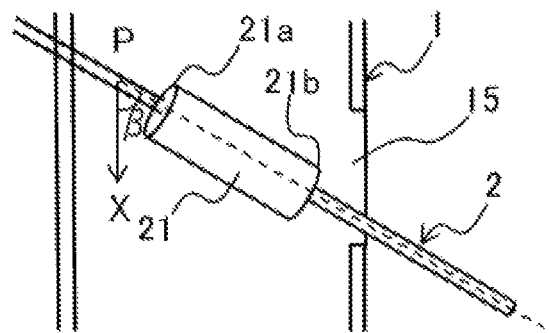
FIG. 4 is a partially enlarged schematic diagram for explaining an inclination angle of the roll portion.

As shown in FIG. 4, it is preferable that the central axis P of the roll portion 21 is disposed with an inclination angle β with respect to the conveyance direction X of the conveying surface 13 so that one end 21a of the cylindrical roll portion 21 is disposed closer to the raw material inlet 11 side than other end 21b. As shown in FIG. 4, the inclined arrangement of the roll portion 21 facilitates movement of the captured material captured by the roll portion 21 to the notch 15 while sliding along the outer surface of the roll portion 21 due to its own weight and the rotation of the roll portion 21, thereby suppressing the retention of the raw materials 100 in the roll portion 21 for smoother sorting. This makes it easier for the raw materials 100 to slide along the outer surface of the roll portion 21 and move into the notch 15 due to its own weight and the rotation of the roll portion 21.

If the inclination angle β is too small, a contact time between the raw materials and the roll portion 21 cannot be taken properly and the material to be sorted may be discharged from the notch 15. On the other hand, if the inclination angle β is too large, the raw materials 100 may not be conveyed properly near the roll portion 21 and the raw materials 100 may be retained. The inclination angle β can be adjusted appropriately according to the balance between the inclination angle α of the conveying surface 13 and the feeding speed of the raw materials 100. For example, when processing the electronic and electric equipment component scraps as the raw materials 100, the angle is preferably 20° to 60°, and more preferably 30° to 50°.

According to the sorting machine of the embodiment of the present invention, it is provided that the gate device 2 provided with the cylindrical roll portion 21 disposed on a conveying surface 13 with a certain distance d to allow at least a part of the raw materials 100 to pass through to the receiving port 12. As a result, specific component parts having a specific shape can be efficiently and easily sorted with a minimum power from the raw materials containing various substances having different shapes.

In particular, by using the sorting machine according to the embodiment of the present invention when recovering metal scraps from a plurality of component scraps, such as circuit boards, parts such as ICs and connectors, synthetic resins (plastics) used for housings, etc., and wire scraps as the raw materials 100, it is possible to selectively sort valuable metals while reducing the smelting inhibitors, and it is also possible to produce input materials for feeding the sorted valuable metals into the smelting process more efficiently.

Figure 5:
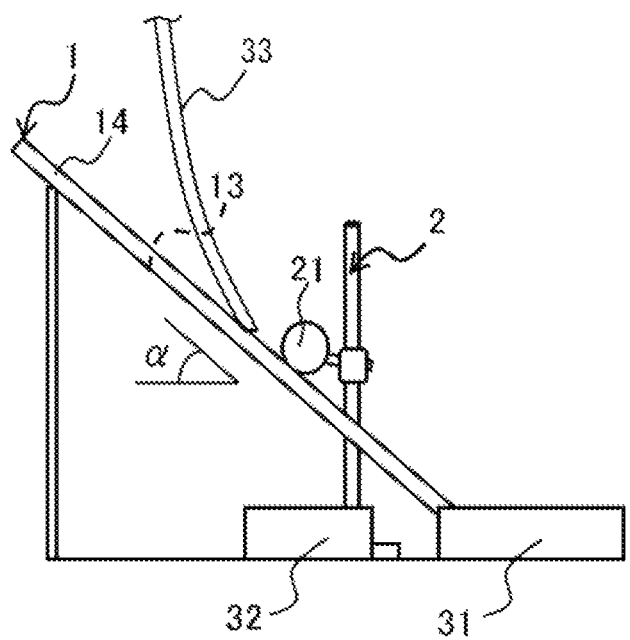
FIG. 5 is a side view of the sorting machine according to a modified example of an embodiment of the present invention.

In addition, it may be possible to cover a part or all of the conveying surface 13 in the width direction in front of the roll portion 21 with a pressing member 33 as shown in FIG. 5. Some materials may jump and move on the conveying surface 13. In such a case, even the raw materials that should pass through the roll portion 21 may hit the roll portion 21 and fall in front of the roll portion 21 without passing through the roll portion 21 and be carried out from the notch 15. As shown in FIG. 5, by installing a holding member 33 that can prevent the material from jumping, the mis-sorting of the raw materials can be reduced. The holding member 33 may preferably have a shape such as a sheet that allows the raw materials to be held onto the conveying surface 13. Although any material can be used for the holding member 33, it may preferable that the holding member 33 has a softness enough to follow the conveying surface 13. If the force to hold the material by the holding member 33 is too strong, the raw materials may not roll well on the conveying surface 13. It is preferable to use a relatively light-weight sheet-like member as the holding member 33. For example, a vinyl sheet of 1 mm or less in thickness may be suitably used.

(Method for Processing Electronic and electric Device Component Scraps)

The sorting machines as shown in FIGS. 1 to 4 may be particularly suitable for sorting and processing the electronic and electric equipment component scraps including various types of component scraps. As used herein, the "electronic and electric device component scraps" refer to scraps obtained by crushing electronic and electric devices such as waste home electric appliances, PCs, and mobile phones, recovering them and then crushing them to have an appropriate size. In the present embodiment, crushing for obtaining the electronic and electric device component scrap may be performed by an operator or it may be purchased in the market.

As for the crushing method, it may be desirable to crush the component scraps without damaging their shapes as much as possible. It may be desirable to use a shear type crusher using a shear method or a hammer type crusher using an impact method. Any apparatus belonging to the category of a crusher for the purpose of fine crashing is not included in the crushing process according to the present embodiment.

The electronic and electric equipment component scraps can be classified into component scraps such as circuit boards, parts such as ICs and connectors, synthetic resins (plastics) used for housings, etc., wire scrap, metal, film component scraps, powdery materials produced by crushing or grinding, and others, and can be further classified according to the purpose of processing. Although it is not limited to the following, in the present embodiment, the electronic and electric device component scraps 1 are preferably crushed to have a maximum particle diameter of about 100 mm or less, further about 50 mm or less, and the percentage of component scrap that is separated as individual components is 70% or more by weight can be suitably processed.

By processing these various types of component scraps in a predetermined order, for example, when the sorted materials are used in the copper smelting process, it is possible to obtain a raw material enriched with valuable metals including gold, silver, platinum, palladium, and copper while minimizing substances that are undesirable for processing in the copper smelting process, such as smelting inhibitors such as elements of antimony (Sb) and nickel (Ni), resins, aluminum (Al), iron (Fe), and the like.

For example, a concentration of valuable metals and a reduction of smelting inhibitors such as aluminum can be simply performed by passing the sorted materials that have been sorted in a sorting process that includes at least one of the following processes: wind power sorting, magnetic sorting, eddy current sorting, specific gravity sorting, and optical sorting which optically sorts metallic materials from non-metallic materials, through the sorting machine as shown in FIG. 1 through FIG. 4.

Figure 6:
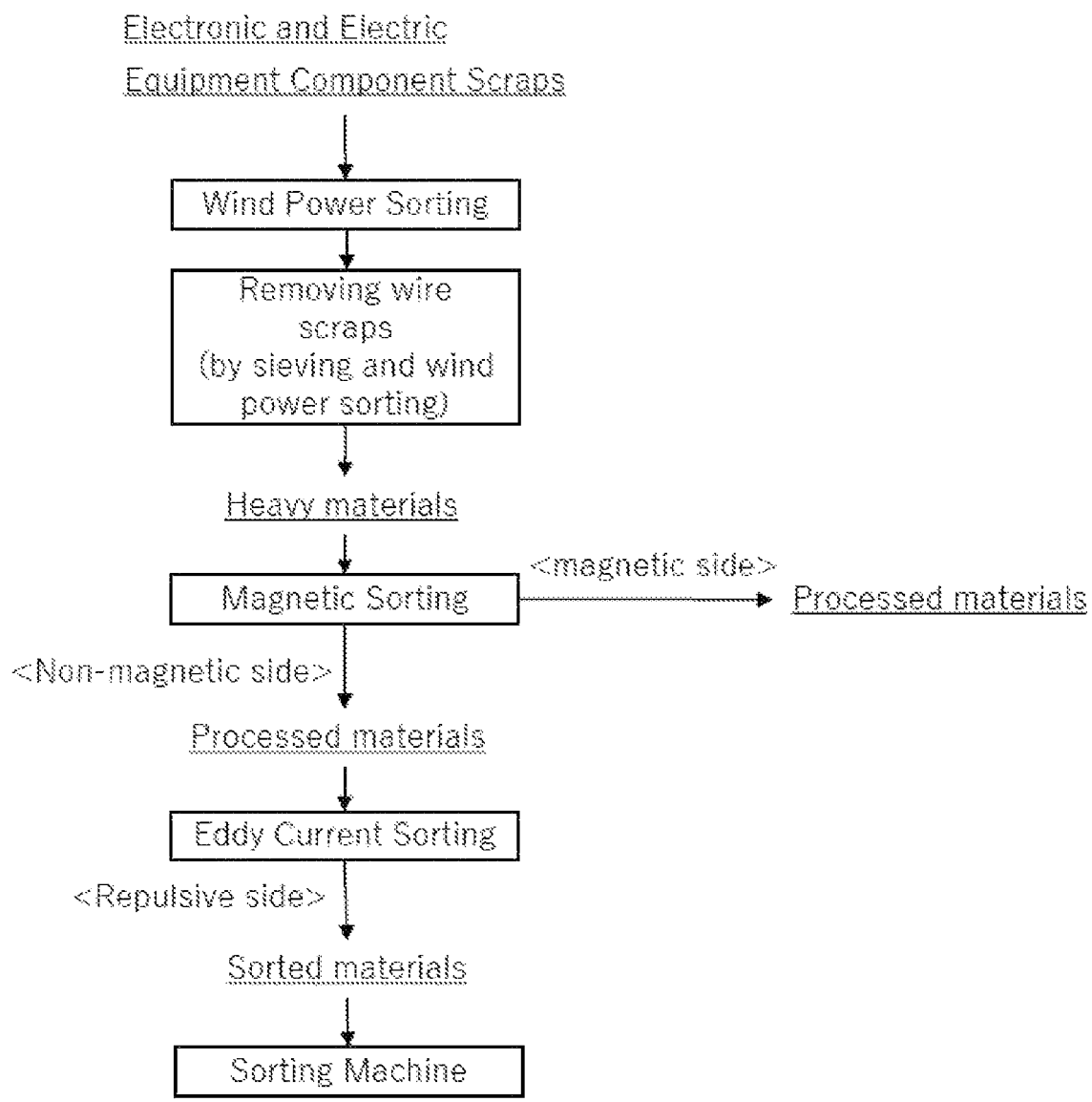
FIG. 6 is a flow diagram according to an embodiment of the present invention.

For example, in the method for processing the electronic and electric equipment component scraps according to the embodiment of the present invention as shown in FIG. 6, the electronic and electric equipment component scraps are subjected to at least two stages of wind power sorting to remove filmy and powdery substances and wire scraps contained in the electronic and electric equipment component scraps. Then, the processed materials from which the filmy and powdery materials and the wire scraps are removed are then subjected to magnetic sorting to sort them into magnetic materials including iron and other materials and non-magnetic materials. Further, the non-magnetic materials are then sorted by eddy current sorting to sort metallic materials and substrates including aluminum into repulsive materials and plastic materials such as housings into non-repulsive materials.

Further, the metallic materials and substrates including aluminum and the like sorted in the repulsive materials are sorted by using the sorting machines as shown in FIG. 1 to FIG. 4 to sort the sorted materials including metallic materials such as thin aluminum and captured materials including capacitors and thick substrates by the gate device 2. By processing the electronic and electric equipment component scraps in accordance with this procedure, it is possible to concentrate, for example, capacitors in the captured materials captured by the gate device 2 and efficiently sort thin metallic materials to the sorted materials on the receiving port 12.

The present invention is not limited to each embodiment, and the components may be modified and embodied without departing from the spirit of the present invention. Further, various inventions may be created by appropriately combining the plurality of components disclosed in the present embodiment. For example, some components may be removed from all the components shown in the embodiments, or the components of different embodiments may be optionally combined.

EXAMPLES

Examples of the present invention are shown below, but these examples are provided for a better understanding of the present embodiment and its advantages, and are not intended to limit the invention.

After removing powdery and filmy materials by wind power sorting, the heavy materials obtained after removing wire scraps by conducting sieving and wind power sorting are magnetically sorted. Eddy current sorting is performed on the processed materials that are sorted to the non-magnetic side by the magnetic sorting, and the sorted materials that are sorted to the repulsive side are used as the materials to be processed. A conveyer having a conveying surface with a width of 650 mm and guides with a height of 5 to 10 mm, an inclination angle α of 50° was used as a conveying device. A notch was provided over a length of 1344 mm on one of the guides installed at both ends of the conveying surface, and a gate device was inserted through the notch toward the conveying surface and fixed at a certain distance on the conveying surface. The inclination angle β between the central axis of the roll portion and the conveying direction was 45°. The roll portion was made of rubber elastic material having a diameter of 50 mm and a length of 300 mm, and the roll portion was rotated clockwise at 300 rpm by a drive mechanism, and the object to be processed is supplied to the material input port for processing.

The sorting process was conducted by varying the distance d between the conveying surface and the roll portion from 5 to 15 mm for four different materials provided from different sources. It was found that although the optimal distance d was varied depending on the materials, aluminum-containing materials such as capacitors, ICs, and substrates were all efficiently sorted from the materials to be processed within the above distance range. Examples of the sorting results of capacitors and metal scraps of raw materials A are shown in Table 1. According to the present example, the metal scraps including substrates, aluminum-containing capacitors, ICs, etc., which should have passed through a roller gate and been sorted on the receiving port side (under the gate), were almost all sorted on the receiving port side as intended.

|  | Repulsive side (Above the gate) | Receiving port side (Under the gate) | Distribution Rate (%) |
| --- | --- | --- | --- |
| Capacitors | 28 | 1 | 29 |
| Metal Scraps | 57 | 8 | 65 |

DESCRIPTION OF REFERENCE NUMERALS

1 . . . Conveying device
2 . . . Gate device
11 . . . Raw material inlet
13 . . . Conveying surface
14 . . . Guide(s)
15 . . . Notch
21 . . . Roll portion
21*a* . . . One end
21*b* . . . Other end
22 . . . Support portion
23 . . . Holding member
31 . . . Sorting material accommodating unit
32 . . . Captured material accommodating unit
100 . . . Raw materials

The invention claimed is:

1. A sorting machine comprising:
    a conveying device having a conveying surface which conveys raw materials containing substances having different shapes from a raw material inlet to a receiving port;
    a gate device provided with a cylindrical roll portion having a rotating function, arranged with a certain space on the conveying surface to allow at least a part of the raw materials to pass through to the receiving port; and
    a holding sheet that extends across a width direction of the conveying surface in front of the roll portion and covers the conveying surface so as to hold the raw material on the conveying surface, the holding sheet comprising a vinyl sheet having a thickness of 1 mm or less.

2. The sorting machine according to claim 1, wherein guides are provided at both ends of the conveying surface, and one of the guides comprises a notch which conveys the raw materials captured by the roll portion outside the conveying surface.

3. The sorting machine according to claim 1, wherein the conveying surface is inclined at 30 to 75 degrees with respect to a horizontal plane.

4. The sorting machine according to claim 1, wherein the roll portion has a central axis inclined to a conveying direction of the conveying surface.

5. The sorting machine according to claim 1, wherein a surface of the roll portion is formed of an elastic member.

6. The sorting machine according to claim 1, wherein the holding sheet extends across the entire surface of the conveying surface in front of the roll portion.

7. A method for processing electronic and electric device component scraps comprising:
providing raw materials containing substances having different shapes from a raw material inlet of a sorting machine, the sorting machine comprising:
a conveying device comprising a conveying surface to convey the raw materials from the raw material inlet to a receiving port;
a gate device provided with a cylindrical roll portion having a rotating function, arranged with a certain space on the conveying surface to allow at least a part of the raw materials to pass through to the receiving port; and
a holding sheet that extends across a width direction of the conveying surface in front of the roll portion and covers the conveying surface so as to hold the raw material on the conveying surfaces, the holding sheet comprising a vinyl sheet having a thickness of 1 mm or less, and
sorting the electronic and electric device component scraps using the sorting machine.

8. The method for processing electronic and electric device component scraps according to claim 7, wherein the electronic and electric device component scraps comprise component scraps including substrates, capacitors, and metal scraps that are sorted to a repulsive side by eddy current sorting.

9. The method for processing electronic and electric device component scraps according to claim 7, wherein the holding sheet extends across the entire surface of the conveying surface in front of the roll portion.

\* \* \* \* \*